US007975226B2

United States Patent
Blose et al.

(10) Patent No.: US 7,975,226 B2
(45) Date of Patent: Jul. 5, 2011

(54) DETERMINING PRESENTATION EFFECTS FOR A SEQUENCE OF DIGITAL CONTENT RECORDS

(75) Inventors: Andrew C. Blose, Penfield, NY (US); Joel S. Lawther, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 1054 days.

(21) Appl. No.: 11/763,546

(22) Filed: Jun. 15, 2007

(65) Prior Publication Data

US 2008/0309647 A1      Dec. 18, 2008

(51) Int. Cl.
*G06F 17/00* (2006.01)
(52) U.S. Cl. ......... 715/726; 715/716; 715/723; 715/730
(58) Field of Classification Search .................. None
See application file for complete search history.

(56) References Cited

U.S. PATENT DOCUMENTS

| | | | |
|---|---|---|---|
| 6,686,970 B1 * | 2/2004 | Windle | 348/584 |
| 7,739,599 B2 * | 6/2010 | Patten et al. | 715/723 |
| 2004/0012576 A1 | 1/2004 | Cazier | 345/204 |
| 2004/0146275 A1 * | 7/2004 | Takata et al. | 386/52 |
| 2006/0092771 A1 | 5/2006 | Loui et al. | |
| 2006/0224964 A1 | 10/2006 | Schwartz et al. | |
| 2008/0120550 A1 * | 5/2008 | Oakley et al. | 715/723 |

* cited by examiner

*Primary Examiner* — Doug Hutton
*Assistant Examiner* — James H Blackwell
(74) *Attorney, Agent, or Firm* — Justin D. Petruzzilli; Raymond L. Owens

(57) ABSTRACT

Various embodiments of the present invention pertain to determining presentation effects for a sequence of digital content records based at least upon a comparison of environmental conditions in which the digital content records were captured. Examples of such environmental conditions include time-date of capture, geographic location of capture, direction of capture, altitude of capture, etc. By determining presentation effects based upon environmental conditions, such presentation effects can be quickly and intelligently determined, with reduced user interaction as compared to conventional schemes.

14 Claims, 8 Drawing Sheets

DETERMINING PRESENTATION EFFECTS FOR A SEQUENCE OF DIGITAL CONTENT RECORDS

FIELD OF THE INVENTION

The invention relates generally to the presentation of digital content records. For example, various embodiments of the present invention pertain to determining presentation effects for a sequence of digital content records based at least upon a comparison of environmental conditions in which the digital content records were captured.

BACKGROUND OF THE INVENTION

The enjoyment and utilization of digital content can take many forms. Traditional methods often involve the generation of hardcopy prints and arranging them in a photo album to be shared with others. With the growing availability and popularity of softcopy displays to view digital content, new methods of digital content utilization have emerged. Multimedia presentations are a popular new method of viewing digital content and reliving memories.

Multimedia presentations offer a much richer experience than viewing photo prints or watching the sequential display of digital images on a softcopy display. These presentations provide consumers a wide variety of creative mechanisms that can be employed to generate interesting and compelling multimedia experiences. The generation of presentations involves the selection of digital content records (also referred to herein as "assets"), the display sequence of the digital content records, and presentation effects. Presentation effects include a wide variety of visual and auditory techniques that provide a richer, more interesting experience. Software programs like Microsoft™ Powerpoint™ offer presentation effects that include, for example, presentation transitions that visually or audibly transition between displayed assets.

Many types of presentation transitions currently exist, including various forms of dissolves, fades, wipes, movements, sound effects, and presentation durations each providing a different experience that can enhance the overall presentation. In addition, each type of presentation transition often has associated parameters that adjust how the presentation transition is implemented and with what level of magnitude it is implemented. For example, parameters for a movement transition may indicate a direction of movement of an asset, as well how fast the asset moves, thereby indicating its velocity magnitude. However, the sheer quantity of available presentation transition types and their associated parameters can be overwhelming for the consumer generating the presentation.

One of the types of presentation transitions employed in multimedia presentations is the presentation duration for particular assets. Consumers can vary the length of time an asset is displayed, i.e., can vary the presentation duration's magnitude, to affect the pace of the presentation and to enhance its overall quality. However, specifying a presentation duration for individual assets can be time consuming and tedious, especially for long presentations.

Accordingly, a need in the art exists for an improved way to generate presentation effects for digital content record presentations.

SUMMARY

The above-described problems are addressed and a technical solution is achieved in the art by systems and methods for determining presentation effects for a sequence of digital content records according to various embodiments of the present invention. According to an embodiment of the present invention, at least some of the digital content records have associated metadata categories that represent environmental conditions present at the time the corresponding digital content records were captured. These categories can include, but are not limited to, time-date of capture, geographic location of capture, direction of capture, or altitude of capture.

In this regard, according to an embodiment of the present invention, metadata (referred to as "First Metadata") associated with a digital content record (referred to as a "First Digital Content Record") in the sequence of digital content records is accessed. According to this embodiment, the First Metadata identifies an environment in which the First Digital Content Record was captured, but does not describe digital imagery of the First Digital Content Record. For example, the First Metadata may identify a geographic location of capture of the First Digital Content Record.

Similarly, according to an embodiment of the present invention, metadata ("Second Metadata") associated with a digital content record ("Second Digital Content Record") in the sequence of digital content records is accessed. The Second Digital Content Record is different than the First Digital Content Record. According to this embodiment, the Second Metadata identifies an environment in which the Second Digital Content Record was captured, but does not describe digital imagery of the Second Digital Content Record. For example, the Second Metadata may identify a geographic location of capture of the Second Digital Content Record. Also according to this embodiment, the First Metadata and the Second Metadata are of a same first category. For example, both the First Metadata and the Second Metadata may be of a same category that identifies a geographic location of capture.

Further, according to an embodiment of the present invention, a type of presentation transition, a magnitude of presentation transition, or both a type and a magnitude of presentation transition between two of the digital content records in the sequence of digital content records is/are determined based at least upon a comparison of the First Metadata and the Second Metadata. For example, a presentation transition of a movement type may be determined based on a difference between the geographic location of capture metadata associated with the First and Second Digital Content Records. In addition, for example, if the difference in geographic locations of capture is large, a large velocity-of-movement magnitude may be used to implement the movement transition. On the other hand, for example, if the difference in geographic locations of capture is small, a small velocity-of-movement magnitude may be used to implement the movement transition. Similarly appropriate sound effects may be selected based on the magnitude of the difference. For example, a large velocity-of-movement magnitude may be represented by a louder or higher-frequency sound effect than a small velocity-of-movement magnitude.

By determining presentation effects for a sequence of digital content records based at least upon a comparison of environmental conditions in which the digital content records were captured, such presentation effects may be generated intelligently and with reduced user-interaction over conventional schemes.

According to an embodiment of the present invention, results of the determining of the presentation transition are stored in a computer-accessible memory system.

In some embodiments of the present invention, metadata from multiple categories may be combined to assist in determining a presentation transition. For example, metadata of a geographic-location-of-capture category may be combined with metadata of a time-date-of-capture category to arrive at an estimate of a person's travel velocity between two locations-of-capture. To elaborate, if a first digital content record is captured at 7:00 AM EST on a particular day in New York City, and a second digital content record is captured at 3:00 PM EST in Los Angeles on the particular day, a computer system may be programmed to infer that the person who captured the images traveled quickly via airplane between New York City and Los Angeles. The computer system may be instructed to use this inference to choose visual or audio presentation transition types and magnitudes that mimic travel by air. On the other hand, if the travel velocity is slow between vastly separated locations, a computer system may be instructed to infer that the two digital content records are unrelated. Consequently, for example, a long duration of presentation may be determined for the earlier of the two digital content records to generate a dramatic pause before moving onto another unrelated event in the presentation.

According to an embodiment of the present invention, a theme for the sequence of digital content records is identified. The theme may be used to determine which metadata categories are to be used as part of determining a presentation transition. For example, if the theme is a "hike", then metadata associated with an altitude of capture may be selected for comparison as part of determining a presentation transition between digital content records.

According to an embodiment of the present invention, the determining of the presentation transition includes comparing (a) a difference between the First Metadata and the Second Metadata, and (b) a threshold. In this regard, according to some embodiments of the present invention that incorporate themes, a theme for the sequence of digital content records may be used to determine the threshold. For example, assume that the theme is "birthday party", and that the First Metadata and the Second Metadata are of a geographic location of capture category. In this example, the threshold may be set very low in order to identify differences between images captured in different rooms of a house, as opposed to a high threshold which might identify differences between images captured in different parts of a country.

According to an embodiment of the present invention, the determining of the presentation transition also is based at least upon an order of evaluation of the comparison of multiple categories of metadata between digital content records. For example, a computer system may be programmed to first compare metadata associated with a geographic-location-of-capture category. If a difference between locations of capture between two digital content records does not exceed a threshold, the computer system may be instructed to then compare metadata associated with a direction-of-capture category. If a difference between the directions of capture exceed a threshold, then a presentation transition may be determined based upon a substantial change in direction of capture.

In some embodiments of the present invention that incorporate themes, a theme may be used to facilitate determining in what order metadata categories are evaluated. For example, a sequence of digital content records associated with a birthday theme may compare a different set and order of metadata categories than a sequence of digital content records associated with a vacation theme.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Various embodiments of the present invention pertain to determining presentation effects for a sequence of digital content records based at least upon a comparison of environmental conditions in which the digital content records were captured. Examples of environmental conditions include, but are not limited to, time-date of capture, geographic location of capture, direction of capture, altitude of capture, temperature at capture, etc. According to an embodiment of the present invention, these environmental conditions may be stored with the digital content records as categories of metadata. For example, a digital content record may have various categories of metadata stored with it, such as a time-date of capture metadata category, a geographic location of capture category, etc. The time-date of capture metadata category may have metadata values associated with it indicating an actual time and date when the digital content record was captured. The geographic location of capture metadata category may have metadata values associated with it indicating latitude and longitude coordinates where the digital content record was captured. By determining presentation effects based upon environmental conditions, such presentation effects can be quickly and intelligently determined, with reduced user interaction as compared to conventional schemes.

The phrase, "digital content record", as used herein, refers to any digital content record, such as a digital still image, a digital audio file, a digital video file, etc. Frequently, this disclosure uses the word "asset" as a short-hand equivalent to the phrase "digital content record." In addition, it should be noted that, unless otherwise explicitly noted or required by context, the word "or" is used in this disclosure in a non-exclusive sense.

Figure 1:
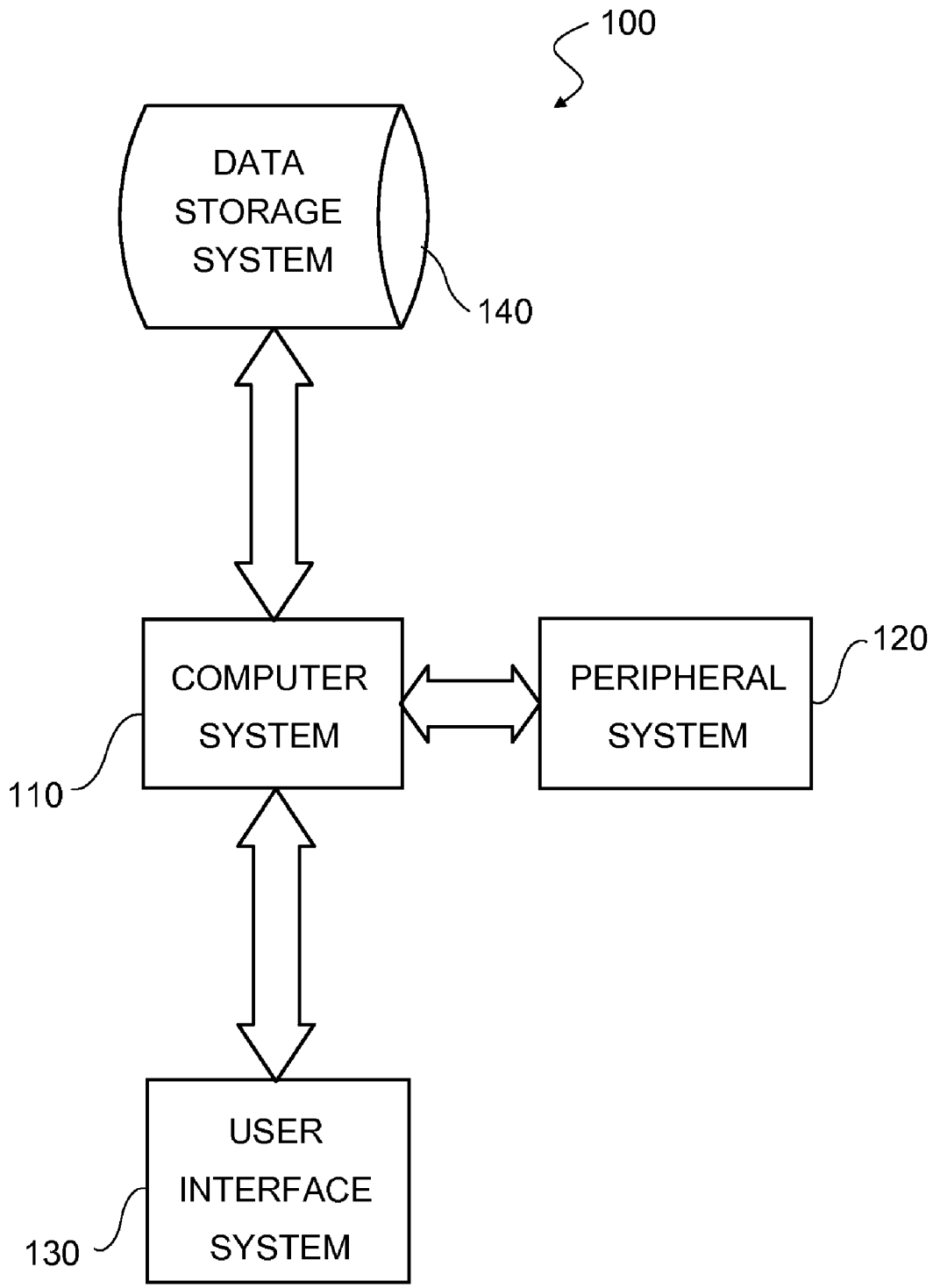
FIG. 1 illustrates a system for determining presentation effects for a sequence of digital content records, according to an embodiment of the present invention.

FIG. 1 illustrates a system for determining presentation effects for a sequence of digital content records, according to an embodiment of the present invention. The system 100 includes a computer system 110, a peripheral system 120, a user interface system 130, and a data storage system 140. The data storage system 140, the peripheral system 120, and the user interface system 130 are communicatively connected to the computer system 110. The computer system 110 includes one or more computers that implement the processes of the various embodiments of the present invention, including the example processes of FIGS. 2-8 described herein.

The term "computer" is intended to be a synonym for or include any data processing device, such as a central processing unit ("CPU"), a desktop computer, a laptop computer, a mainframe computer, a personal digital assistant, a Blackberry™, or any other device for processing data, managing data, or handling data, whether implemented with electrical, magnetic, optical, biological components, or otherwise.

The data storage system 140 includes one or more computer-accessible memories configured to store the information needed to execute the processes of the various embodiments of the present invention, including the example processes of FIGS. 2-8 described herein. The data-storage system 140 may be a distributed data-storage system including multiple computer-accessible memories communicatively connected to the computer system 110 via a plurality of computers and/or devices. On the other hand, the data storage system 140 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, computers, or programs in which data may be communicated. Further, the phrase "communicatively connected" is intended to include a connection between devices or programs within a single computer, a connection between devices or programs located in different computers, and a connection between devices not located in computers at all. In this regard, although the data storage system 140 is shown separately from the computer system 110, one skilled in the art will appreciate that the data storage system 140 may be stored completely or partially within the computer system 110. Further in this regard, although the peripheral system 120 and the user interface system 130 are shown separately from the computer system 110, one skilled in the art will appreciate that one or both of such systems may be stored completely or partially within the computer system 110.

The peripheral system 120 may include one or more devices configured to provide digital content records to the computer system 110. For example, the peripheral system 120 may include digital video cameras, cellular phones, regular digital cameras, or other computers. The computer system 110, upon receipt of digital content records from a device in the peripheral system 120, may store such digital content records in the data storage system 140.

The user interface system 130 may include a mouse, a keyboard, a mouse and a keyboard, or any device or combination of devices from which data is input to the computer system 110. In this regard, although the peripheral system 120 is shown separately from the user interface system 130, the peripheral system 120 may be included as part of the user interface system 130.

The user interface system 130 also may include a display device, a plurality of display devices (i.e. a "display system"), a computer accessible memory, one or more display devices and a computer accessible memory, or any device or combination of devices to which data is output by the computer system 110.

Figure 2:
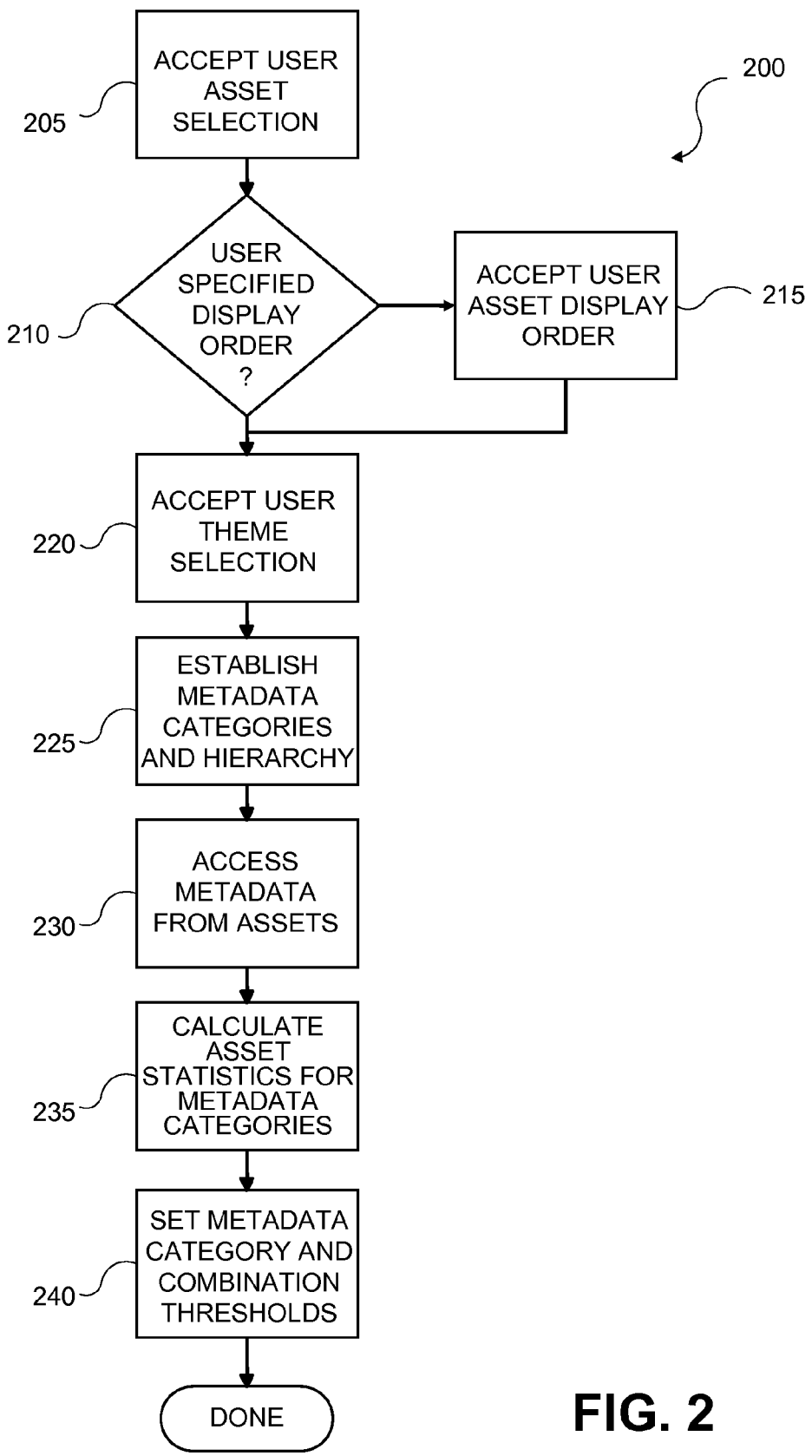
FIG. 2 illustrates a method for configuring a system for determining presentation effects for a sequence of digital content records, according to an embodiment of the present invention.

FIG. 2 illustrates a method 200 for configuring the system 100 for determining presentation effects for a sequence of digital content records, according to an embodiment of the present invention. At step 205, the computer system 110 accepts, from the user interface system 130, the selection of a user's digital content records, or assets, to be included in a presentation. However, it should be noted that user-selection of assets to be included in the presentation is not required and that, alternatively or in addition, the computer system 110 may be programmed to select assets.

At step 210, the user may elect to specify an explicit display order for some or all of the assets selected in step 205 ("YES" for decision box 210). If so, at step 215, using the user interface system 130, the user specifies the order in which the assets will appear in the presentation. If the user does not elect to specify an explicit display order ("NO" for decision box 210), the display order may be generated by the computer system 110, such as by using time-date of capture metadata for the assets or some other technique known in the art. At step 220, using the user interface system 130, the user may specify a theme for the presentation. Possible themes include, but are not limited to, "Vacation", "Life Story", "Hike", "Special Place", "Adventure", "Day Trip" and "Wedding". At step 225, the theme specified in step 220 (if one was specified) may be used to assist in determining presentation effects. For example, the theme may be used to facilitate selection of which metadata categories are evaluated and the order in which these categories are evaluated when determining effects, as described, for example in FIG. 3, below. At step 230, the data storage system 140 is accessed by the computer system 110 and the metadata for the categories established in step 225 is read from at least some of the assets specified in step 205. At step 235, metadata values of at least some of the metadata read in step 230 may be used to calculate statistics for each metadata category established in step 225. Such statistics may include, but are not limited to, an overall average, an average difference between adjacent assets, a minimum, and a maximum. At step 240, the values calculated in step 235 may be used to set one or more thresholds, such as minimum threshold, a maximum threshold, or both, for each metadata category established in step 225. Thresholds also may be set for appropriate combinations of metadata categories, such as the combination of a location-of-capture category and a time-date-of-capture category to arrive at velocity thresholds. These thresholds may be used when determining presentation effects, as illustrated in FIG. 3, for example.

Figure 3:
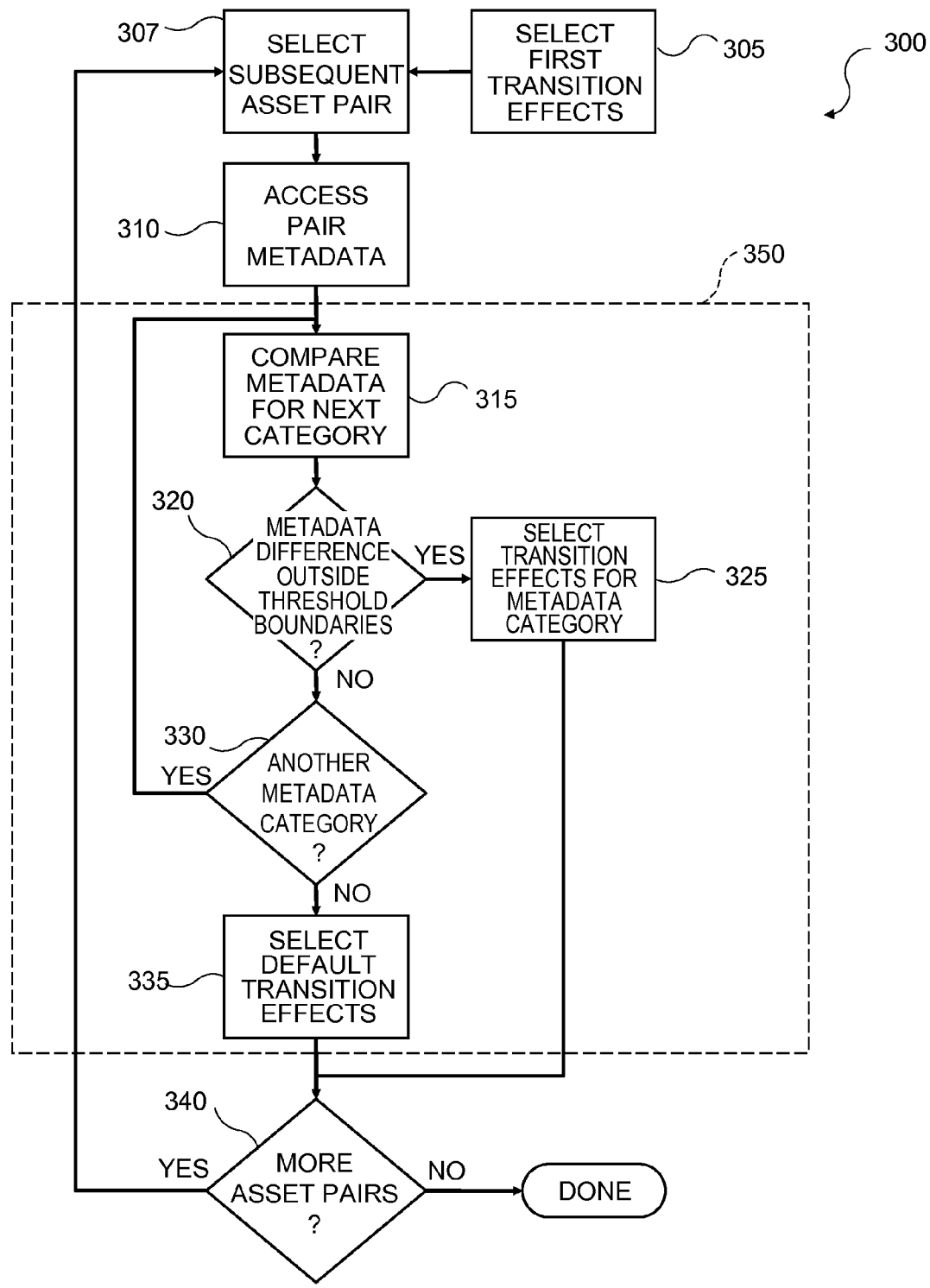
FIG. 3 illustrates a method for determining presentation transitions for a sequence of digital content records, according to an embodiment of the present invention.

FIG. 3 illustrates a method 300 for determining presentation transitions for a sequence of digital content records, according to an embodiment of the present invention. At step 305, initial visual and audio transition effects may be selected for the first asset in the presentation. This transition can be user-selected, selected by the computer system 110 at random or from an established default transition for the beginning of a presentation, or by any other technique known in the art. At step 307, the subsequent asset pair is selected from the sequence of assets specified in step 205. This subsequent asset pair consists of two assets referred to herein as a "first"

asset and a "second" asset for purposes of clarity, even though they may not be the actual first and second assets in the sequence of digital content records. It should be noted that the first and second assets do not necessarily need to be sequentially directly adjacent to each other. For example another asset may be between the first and second assets.

At step 310, the metadata values for at least a first metadata category established in step 225 is accessed from the asset pair identified at step 307. At step 315, the accessed metadata values for the first metadata category in the series of metadata categories established in step 225 are compared. It should be noted, however, that step 225 need not identify a series of metadata categories and, instead, may identify only a single metadata category. If the difference between the metadata values is outside one or more threshold boundaries established in step 240 ("YES" for decision box 320), presentation transition effects type or magnitude for the metadata category is selected at step 325. The transition can be used for the transition between the first and second assets or some of all of the assets sequentially residing between the first and second asset in the case where the first and second assets are not sequentially directly adjacent. On the other hand, if the difference in metadata values is not outside the one or more threshold boundaries established in step 240 ("NO" for decision box 320), the next metadata category, if it exists ("YES" to decision box 330), is selected and steps 315 and 320 are repeated for the current asset pair. If no other metadata categories remain ("NO" to decision box 330), a user-selected presentation transition type or magnitude, or a computer system 110 selected default, random, etc. presentation transition effect types or magnitudes may be selected at step 335. If more asset pairs remain to be processed ("YES" to decision box 340), the method 300 returns to step 307 to begin processing the next asset pair. The method 300 ends when no more unprocessed asset pairs remain ("NO" to step 340).

Figure 4:
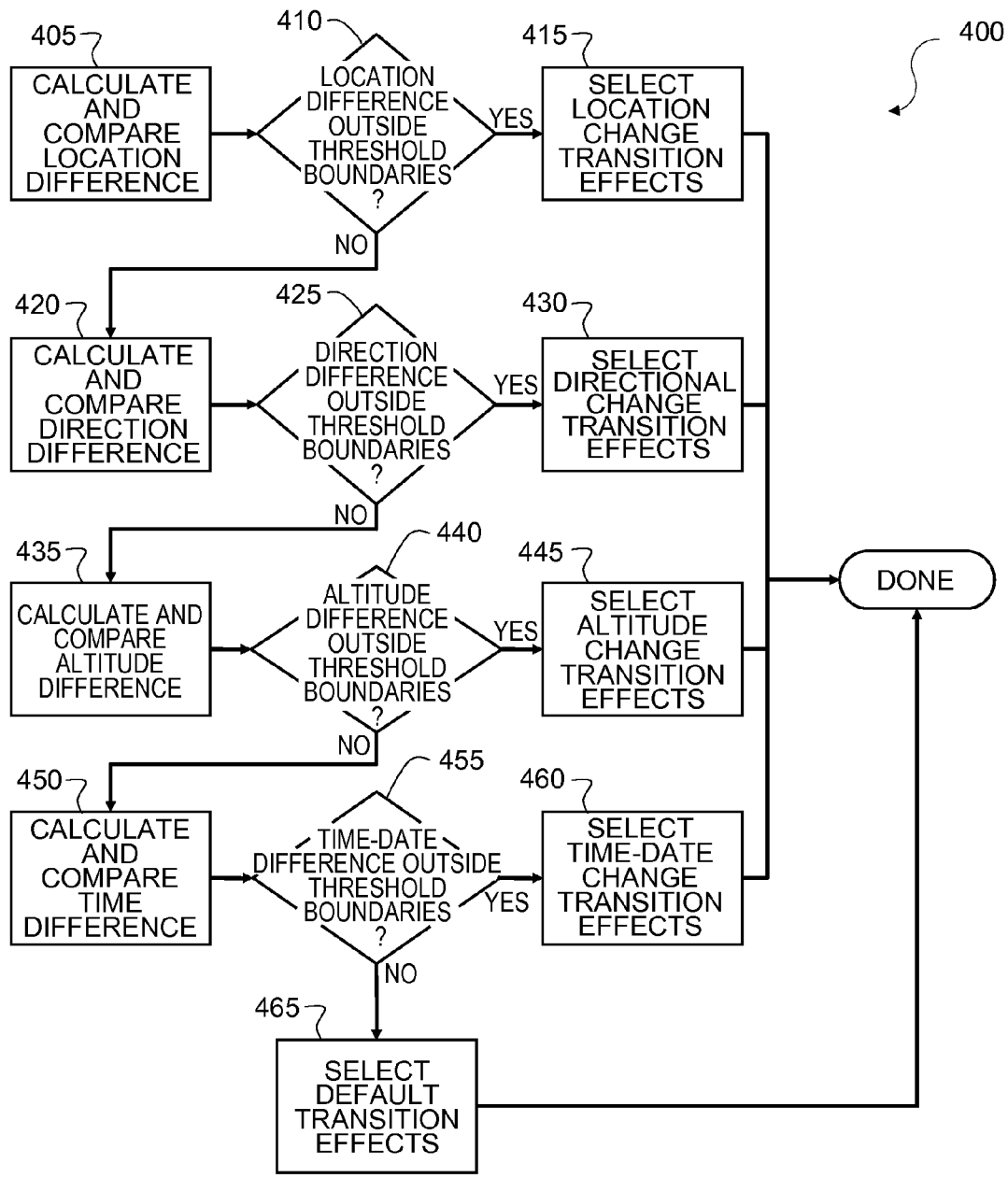
FIG. 4 illustrates a specific example of a portion of the method of FIG. 3, according to an embodiment of the present invention.

FIG. 4 illustrates a specific example of a portion of the method 300 of FIG. 3, according to an embodiment of the present invention. In particular, the method 400 of FIG. 4 is one possible embodiment of the steps shown in grouping box 350 in FIG. 3. The presence and order of comparisons: 410, 425, 440, and 455 may be theme-dependent as optionally established at step 225 in FIG. 2. At step 405, which corresponds to step 315 in FIG. 3, a difference in the asset pair's location category metadata are calculated and compared by the computer system 110. At step 410, which corresponds to step 320 in FIG. 3, if the difference from step 405 is outside one or more threshold boundaries established in step 240 ("YES" for decision box 410), presentation transition effect types or magnitudes suitable for a substantial location change between assets may be selected at step 415.

Figure 5:
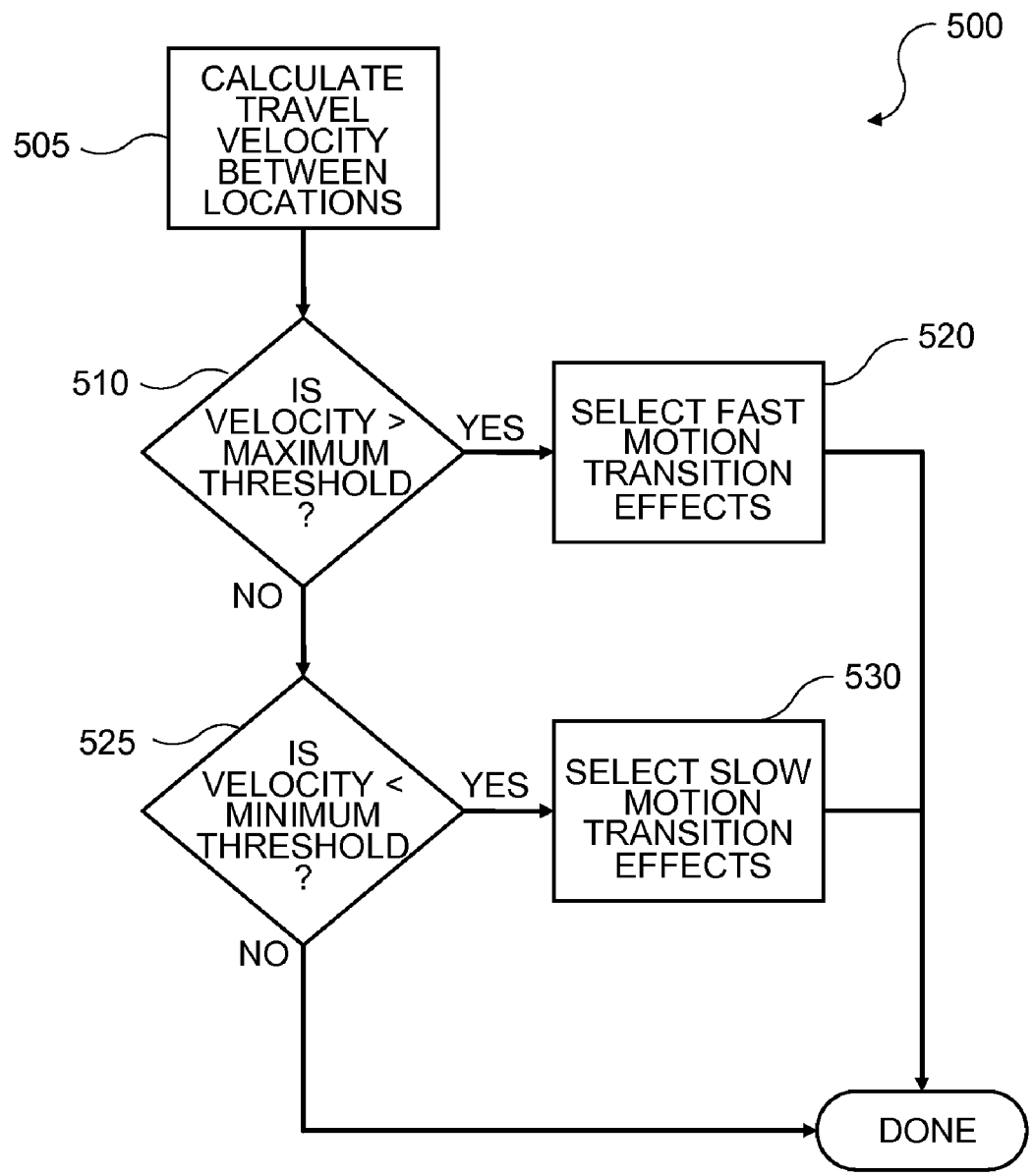
FIG. 5 illustrates a specific example of determining a location-change presentation-transition described in FIG. 4, according to an embodiment of the present invention.

To elaborate, FIG. 5 illustrates a specific example of determining location-change presentation-transition-effects described in steps 405, 410, and 415 in FIG. 4, according to an embodiment of the present invention. Step 505 in FIG. 5 corresponds to step 405 in FIG. 4, steps 510 and 525 in FIG. 5 correspond to step 410 in FIG. 4, and steps 520 and 530 in FIG. 5 correspond to step 415 in FIG. 4.

In the embodiment of FIG. 5, the computer system 110 may be used at step 505 to calculate a travel velocity between the geographic locations of capture of the current asset pair using the combination of location of capture and time-date of capture metadata. The travel velocity calculated in step 505 may be compared against a maximum threshold set in step 240 at step 510. If the travel velocity exceeds the threshold ("YES" to decision box 510), fast motion presentation transition effect types and magnitudes may be selected at step 520. For example, the fast motion visual presentation type may be a horizontal movement of the asset pair across a display, and the magnitude of such presentation transition type may be a relatively fast horizontal movement. Alternatively or in addition, the fast motion audio presentation type may be the sound of a vehicle driving, and the magnitude may be the sound of a vehicle driving fast.

On the other hand, if the travel velocity does not exceed the maximum threshold ("NO" to decision box 510), it then may be compared against a minimum threshold set in step 240 at step 525. If the travel velocity is lower than the minimum threshold ("YES" to decision box 525), slow motion transition styles may be selected at step 530. For example, the slow motion visual presentation type may be a horizontal movement of the asset pair across a display, and the magnitude of such presentation transition type may be a relatively slow horizontal movement. Similarly the slow motion audio transition effect will reflect a slower travel type. It should be noted that although the embodiment of FIG. 5, and several of the other embodiments described herein, illustrate multiple threshold boundaries, i.e., a minimum threshold and a maximum threshold, only a single threshold boundary or more than two threshold boundaries may be used.

Returning to FIG. 4, if the difference between the location metadata values is not outside the one or more threshold boundaries established in step 240 ("NO" for decision box 410), the difference in the asset's direction category metadata may be calculated and compared at step 420. If the difference between the direction metadata values is outside one or more threshold boundaries established for this category in step 240 ("YES" for decision box 425), presentation transition effect types or magnitudes suitable for a substantial direction change between assets may be selected at step 430.

Figure 6:
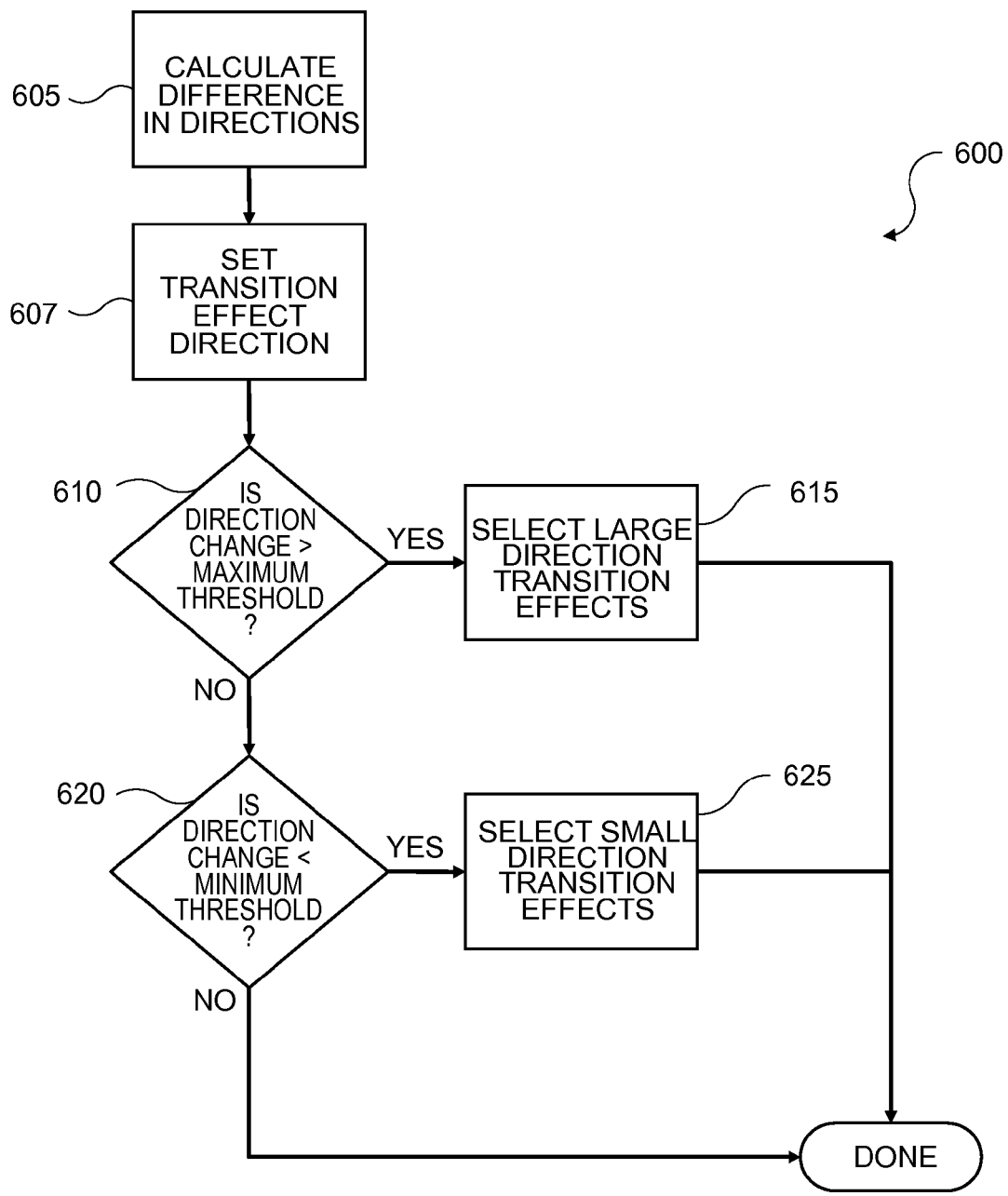
FIG. 6 illustrates a specific example of determining a direction-change presentation-transition described in FIG. 4, according to an embodiment of the present invention.

To elaborate, FIG. 6 illustrates a specific example of determining a direction-change presentation-transition effect described in steps 420, 425, and 430 in FIG. 4, according to an embodiment of the present invention. Step 605 in FIG. 6 corresponds to step 420 in FIG. 4, steps 607, 610 and 620 in FIG. 6 correspond to step 425 in FIG. 4, and steps 615 and 625 in FIG. 6 correspond to step 430 in FIG. 4.

In the embodiment of FIG. 6, the computer system 110 may be used at step 605 to calculate the difference in directions of capture, and, consequently, at step 607 presentation transition type of movement in a direction of either clockwise (right) or counter-clockwise (left) may be determined based on the direction change calculated in step 705. The difference calculated in step 605 may be compared against a maximum threshold set in step 240, and if it exceeds the threshold ("YES" to decision box 610), large direction presentation transition types or magnitudes may be selected at step 615. For example, the large direction visual presentation type may be a movement of the asset pair across a display in the direction of movement between the current pair of assets, and the magnitude of such presentation transition type may be a relatively fast movement in that direction. Alternatively or in addition, a large direction audio presentation type may be a sound effect directed through particular audio channels to emphasize the direction. In this case, the magnitude may be a louder or higher frequency sound effect than for a small direction audio presentation type.

If the direction difference does not exceed the maximum threshold ("NO" to decision box 610), it may be compared against a minimum threshold set in step 240. If the direction difference is lower than this threshold ("YES" to decision box 620) a small direction change transition style may be selected at step 625. For example, the small direction presentation type may be a movement of the asset pair across a display in the direction of movement between the current pair of assets, and the magnitude of such presentation transition type may be a relatively slow movement in that direction. Alternatively or in addition, a small direction audio presentation type may be a sound effect directed through particular audio channels to emphasize the direction. In this case, the magnitude may be a softer or lower frequency sound effect than for a large direction audio presentation type.

Returning to FIG. 4, if the difference between the direction metadata values is not outside the one or more threshold boundaries established in step 240 ("NO" for decision box 425), the difference in the asset pair's altitude category metadata may be calculated and compared at step 435. If the difference between the altitude metadata values is outside one or more threshold boundaries established for this category in step 240 ("YES" for decision box 440), presentation transition effect types or magnitudes suitable for a substantial altitude change between assets may be selected at step 445.

Figure 7:
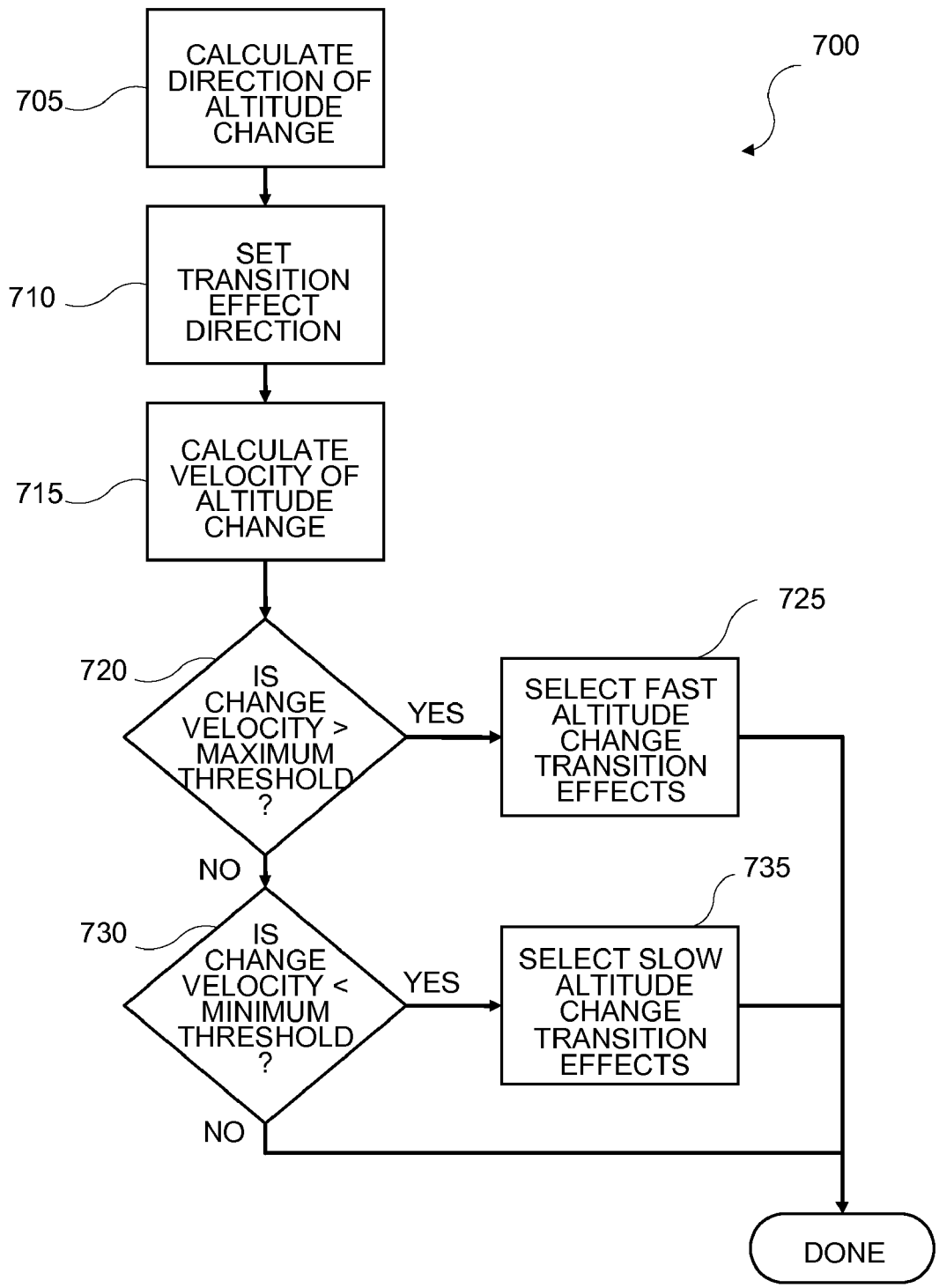
FIG. 7 illustrates a specific example of determining a altitude-change presentation-transition described in FIG. 4, according to an embodiment of the present invention.

To elaborate, FIG. 7 illustrates a specific example of determining an altitude-change presentation-transition effect described in steps 435, 440, and 445 in FIG. 4, according to an embodiment of the present invention. Steps 705, 710, and 715 in FIG. 7 correspond to step 435 in FIG. 4, steps 720 and 730 in FIG. 7 correspond to step 440 in FIG. 4, and steps 725 and 735 in FIG. 7 correspond to step 445 in FIG. 4.

In the embodiment of FIG. 7, the computer system 110 may be used at step 705 to calculate a direction of altitude change, and, consequently, at step 710 presentation transition type of movement in a vertical direction of either up or down may be determined based on the direction of altitude change calculated in step 705. At step 715, a velocity of altitude change may be calculated using metadata from the altitude category and the time-date of capture category. The altitude change velocity calculated in step 715 may be compared against a maximum threshold set in step 240, and if it exceeds the threshold ("YES" to decision box 720), a presentation transition magnitude may be determined to be relatively fast at step 725. For example, movement of the current pair of assets vertically in either the 'up' or 'down' directions across a display may be relatively fast. In addition or in the alternative, an audio pitch of a sound effect may be selected that changes up or down in pitch to reflect the direction of change.

On the other hand, if the altitude change velocity does not exceed the maximum threshold ("NO" to decision box 720), it may be compared against a minimum threshold set in step 240. If the altitude change velocity is lower than the minimum threshold ("YES" to decision box 730), a presentation transition magnitude may be determined to be relatively slow at step 735. For example, movement of the current pair of assets vertically in either the 'up' or 'down' directions across a display may be relatively slow. Again, an audio pitch of the sound effect may be selected that changes up or down in pitch to reflect the direction of change.

Returning to FIG. 4, if the difference between the altitude metadata values is not outside the one or more threshold boundaries established in step 240 ("NO" for decision box 440), a difference in the asset's time-date category metadata may be calculated and compared at step 450. If the difference between the time-date metadata values is outside the one or more threshold boundaries established for this category in step 240 ("YES" for decision box 455), presentation transition effect types or magnitudes suitable for a substantial time-date change between assets may be selected at step 460.

Figure 8:
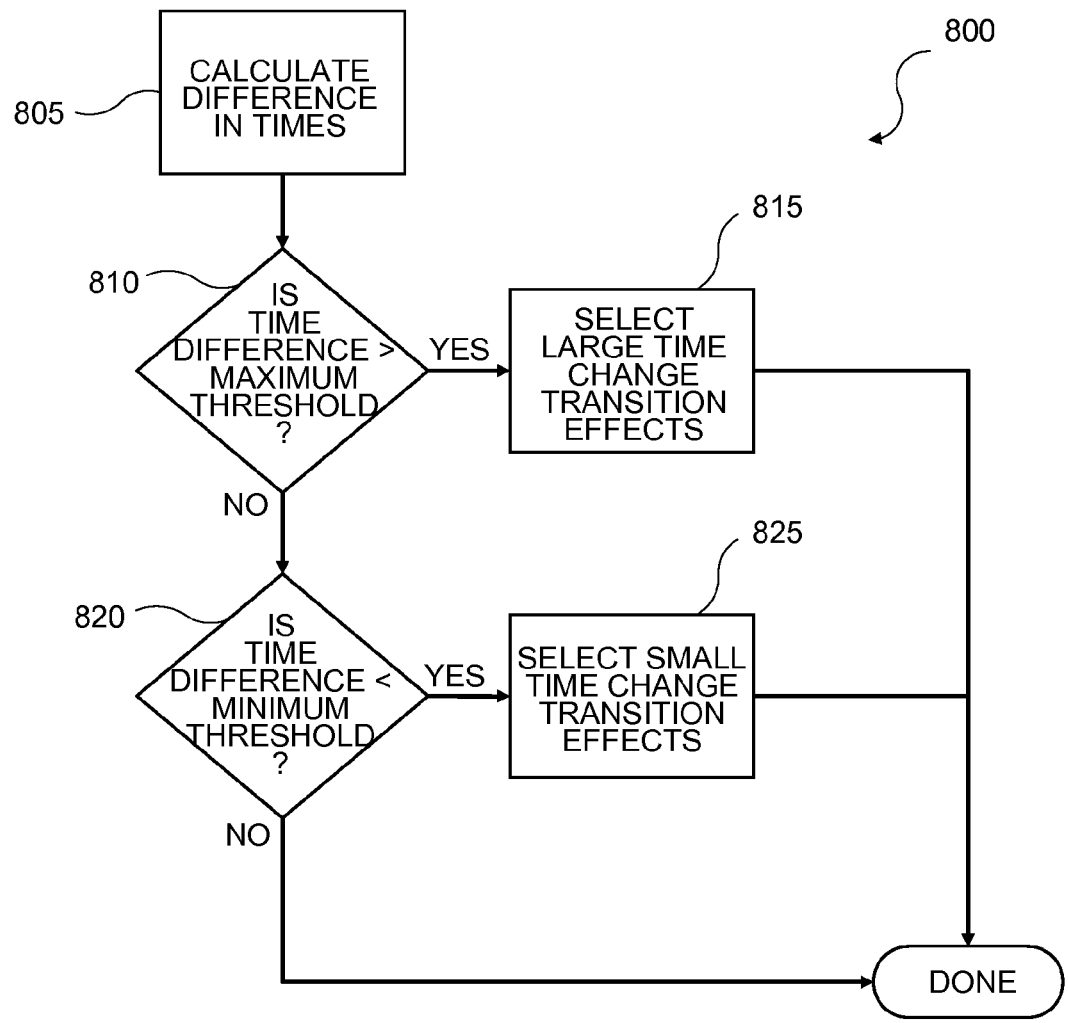
FIG. 8 illustrates a specific example of determining a time-date-change presentation-transition described in FIG. 4, according to an embodiment of the present invention.

To elaborate, FIG. 8 illustrates a specific example of determining a time-date-change presentation-transition effect described in steps 450, 455, and 460 in FIG. 4, according to an embodiment of the present invention. Step 805 in FIG. 8 corresponds to step 450 in FIG. 4, steps 810 and 820 in FIG. 8 correspond to step 455 in FIG. 4, and steps 815 and 825 in FIG. 8 correspond to step 460 in FIG. 4.

In the embodiment of FIG. 8, the computer system 110 may be used at step 805 to calculate a difference in time-dates of capture between the current asset pair, using corresponding metadata of a same time-date category. The difference calculated in step 805 may be compared against a maximum threshold set in step 240, and if it exceeds the threshold ("YES" to decision box 810), a large time change presentation transition type or magnitude may be selected at step 815. For example, the large time change presentation type may be a presentation duration of the first of the two assets in the asset pair, and the magnitude of such presentation transition type may be a relatively long presentation duration of the first of the two assets in the asset pair to cause a dramatic pause before moving onto the next asset.

If the time-date of capture difference does not exceed the maximum threshold ("NO" to decision box 810), it may be compared against a minimum threshold set in step 240. If the time-date of capture difference is lower than the minimum threshold ("YES" to decision box 820) a small time change presentation transition type or magnitude may be selected at step 825. For example, the small time change presentation type may be a presentation duration of the first of the two assets in the asset pair, and the magnitude of such presentation transition type may be a relatively short presentation duration of the first of the two assets in the asset pair so as not to interrupt the presentation of assets closely related in time.

Returning to FIG. 4, if the difference between the time-date metadata values is not outside the one or more threshold boundaries established in step 240 ("NO" for decision box 455), a user-selected presentation transition type or magnitude, or a computer system 110 selected default, random, etc. presentation transition type or magnitude may be selected at step 465.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

100 Drawing
110 Computer System
120 Peripheral System
130 User Interface System
140 Data Storage System
200 Flowchart
205 Step
210 Decision Box
215 Step
220 Step
225 Step
230 Step
235 Step
240 Step
300 Flowchart
305 Step
307 Step
310 Step
315 Step
320 Decision Box
325 Step
330 Decision Box 335 Step
340 Decision Box
350 Grouping Box
400 Flowchart
405 Step
410 Decision Box
415 Step
420 Step
425 Decision Box
430 Step
435 Step
440 Decision Box
445 Step
450 Step
455 Decision Box
460 Step
465 Step
500 Flowchart
505 Step
510 Decision Box
520 Step
525 Decision Box
530 Step
600 Flowchart
605 Step
610 Decision Box
615 Step
620 Decision Box
625 Step
700 Flowchart
705 Step
710 Step
715 Step
720 Decision Box
725 Step
730 Decision Box
735 Step
800 Flowchart
805 Step
810 Decision Box
815 Step
820 Decision Box
825 Step

What is claimed is:

1. A method implemented at least in part by a computer system, the method for determining presentation effects for a sequence of digital content records and comprising the steps of:

accessing first metadata associated with a first digital content record in the sequence of digital content records, the first metadata identifying an environment in which the first digital content record was captured, the first metadata not describing digital imagery of the first digital content record;

accessing second metadata associated with a second digital content record in the sequence of digital content records different than the first digital content record, the second metadata identifying an environment in which the second digital content record was captured, the second metadata not describing digital imagery of the second digital content record, wherein the first metadata and the second metadata are of a same first category;

determining, based at least upon a comparison of the first metadata and the second metadata, one of a type of presentation transition, a magnitude of presentation transition, or both a type and a magnitude of presentation transition between two of the digital content records in the sequence of digital content records;

storing results of the determining step in a computer-accessible memory system;

accessing first supplemental metadata associated with the first digital content record in the sequence of digital content records, the first supplemental metadata identifying an environment in which the first digital content record was captured, the first supplemental metadata not describing digital imagery of the first digital content record;

accessing second supplemental metadata associated with the second digital content record in the sequence of digital content records, the second supplemental metadata identifying an environment in which the second digital content record was captured, the second supplemental metadata not describing digital imagery of the second digital content record;

wherein the determining step is also based at least upon a comparison of the first supplemental metadata and the second supplemental metadata, and wherein the determining step is also based at least upon an order of evaluation of the comparison of (1) the first metadata and the second metadata and (2) the first supplemental metadata and the second supplemental metadata; and wherein the first supplemental metadata and the second supplemental metadata are of a same second category different than the first category.

2. The method of claim 1, wherein the first digital content record is sequentially adjacent to the second digital content record in the sequence of digital content records.

3. The method of claim 1, further comprising the steps of:
identifying a theme for the sequence of digital content records; and
determining the first category based at least upon the theme.

4. The method of claim 3, wherein the theme is one of a vacation, a life story, a hike, a special place, an adventure, a day trip, or a wedding.

5. The method of claim 1, wherein the determining step includes comparing (a) a difference between the first metadata and the second metadata, and (b) a threshold.

6. The method of claim 5, further comprising the step of:
calculating the threshold based upon a comparison of metadata of the first category between at least a plurality of digital content records of the sequence of digital content records.

7. The method of claim 1, wherein the determining step determines that the type of presentation transition is one of (a) a presentation duration of the first digital content record or the second digital content record, (b) a dissolve, (c) a fade, (d) a wipe, or (e) a movement.

8. The method of claim 7, wherein the determining step determines (a) that the type of presentation transition is a presentation duration of the first digital content record or the second digital content record, and (b) that the magnitude of the presentation transition is an amount of time that the first digital content record or the second digital content record is presented.

9. The method of claim 1, wherein the first category is one of a time-date of capture, a geographic location of capture, a direction of capture, or an altitude of capture.

10. The method of claim 1, wherein the theme is one of a vacation, a life story, a hike, a special place, an adventure, a day trip, or a wedding.

11. The method of claim 1, wherein the determining step determines that the type of presentation transition is one of a dissolve, a fade, a wipe, a movement, a sound effect, or a presentation duration.

12. A computer-accessible memory system storing instructions configured to cause a data processing system to implement a method for determining presentation effects for a sequence of digital content records, wherein the instructions comprise:
   instructions for accessing first metadata associated with a first digital content record in the sequence of digital content records, the first metadata identifying an environment in which the first digital content record was captured, the first metadata not describing digital imagery of the first digital content record;
   instructions for accessing second metadata associated with a second digital content record in the sequence of digital content records different than the first digital content record, the second metadata identifying an environment in which the second digital content record was captured, the second metadata not describing digital imagery of the second digital content record, wherein the first metadata and the second metadata are of a same first category;
   instructions for determining, based at least upon a comparison of the first metadata and the second metadata, a type of presentation transition, a magnitude of presentation transition, or both a type and a magnitude of presentation transition between two of the digital content records in the sequence of digital content records;
   instructions for storing results of the determining step in a computer-accessible memory system;
   instructions for accessing first supplemental metadata associated with the first digital content record in the sequence of digital content records, the first supplemental metadata identifying an environment in which the first digital content record was captured, the first supplemental metadata not describing digital imagery of the first digital content record;
   instructions for accessing second supplemental metadata associated with the second digital content record in the sequence of digital content records, the second supplemental metadata identifying an environment in which the second digital content record was captured, the second supplemental metadata not describing digital imagery of the second digital content record;
   wherein the instructions for determining are also based at least upon a comparison of the first supplemental metadata and the second supplemental metadata, and wherein the instructions for determining are also based at least upon an order of evaluation of the comparison of (1) the first metadata and the second metadata and (2) the first supplemental metadata and the second supplemental metadata; and
   wherein the first supplemental metadata and the second supplemental metadata are of a same second category different than the first category.

13. A system comprising:
   a data processing system; and
   a computer accessible memory system storing instructions configured to cause the data processing system to implement a method for determining presentation effects for a sequence of digital content records, wherein the instructions comprise:
   instructions for accessing first metadata associated with a first digital content record in the sequence of digital content records, the first metadata identifying an environment in which the first digital content record was captured, the first metadata not describing digital imagery of the first digital content record;
   instructions for accessing second digital content record associated with a digital content record second digital content record the sequence of digital content records different than the first digital content record, the second metadata identifying an environment in which the second digital content record was captured, the second metadata not describing digital imagery of the second digital content record, wherein the first metadata and the second metadata are of a same first category;
   instructions for determining, based at least upon a comparison of the first metadata and the second metadata, a type of presentation transition, a magnitude of presentation transition, or both a type and a magnitude of presentation transition between the two digital content records in the sequence of digital content records;
   instructions for storing results of the determining step in a computer-accessible memory system;
   instructions for accessing first supplemental metadata associated with the first digital content record in the sequence of digital content records, the first supplemental metadata identifying an environment in which the first digital content record was captured, the first supplemental metadata not describing digital imagery of the first digital content record;
   instructions for accessing second supplemental metadata associated with the second digital content record in the sequence of digital content records, the second supplemental metadata identifying an environment in which the second digital content record was captured, the second supplemental metadata not describing digital imagery of the second digital content record;
   wherein the instructions for determining are also based at least upon a comparison of the first supplemental metadata and the second supplemental metadata, and wherein the instructions for determining are also based at least upon an order of evaluation of the comparison of (1) the first metadata and the second metadata and (2) the first supplemental metadata and the second supplemental metadata; and
   wherein the first supplemental metadata and the second supplemental metadata are of a same second category different than the first category.

14. A method implemented at least in part by a computer system, the method for determining presentation effects for a sequence of digital content records and comprising the steps of:
   accessing first metadata associated with a first digital content record in the sequence of digital content records, the first metadata identifying an environment in which the first digital content record was captured, the first metadata not describing digital imagery of the first digital content record;
   accessing second metadata associated with a second digital content record in the sequence of digital content records different than the first digital content record, the second metadata identifying an environment in which the second digital content record was captured, the second metadata not describing digital imagery of the second digital content record, wherein the first metadata and the second metadata are of a same first category;
   determining, based at least upon a comparison of the first metadata and the second metadata, one of a type of presentation transition, a magnitude of presentation transition, or both a type and a magnitude of presentation transition between two of the digital content records in the sequence of digital content records;

storing results of the determining step in a computer-accessible memory system;

accessing first supplemental metadata associated with the first digital content record in the sequence of digital content records, the first supplemental metadata identifying an environment in which the first digital content record was captured, the first supplemental metadata not describing digital imagery of the first digital content record; and accessing second supplemental metadata associated with the second digital content record in the sequence of digital content records, the second supplemental metadata identifying an environment in which the second digital content record was captured, the second supplemental metadata not describing digital imagery of the second digital content record, wherein the determining step also is based at least upon a comparison of the first supplemental metadata and the second supplemental metadata;

wherein the first supplemental metadata and the second supplemental metadata are of a same second category different than the first category;

wherein the determining step is also based at least upon an order of evaluation of the comparison of (1) the first metadata and the second metadata and (2) the first supplemental metadata and the second supplemental metadata;

identifying a theme for the sequence of digital content records; and determining the order of evaluation based at least upon the theme.

* * * * *